Sept. 15, 1942.  C. F. PATTERSON  2,296,178
LUBRICATION SYSTEM
Filed May 10, 1941  2 Sheets-Sheet 1

Inventor
C. F. Patterson
By Paul O. Pippel
Atty.

Sept. 15, 1942.                C. F. PATTERSON                 2,296,178
                               LUBRICATION SYSTEM
                              Filed May 10, 1941            2 Sheets-Sheet 2
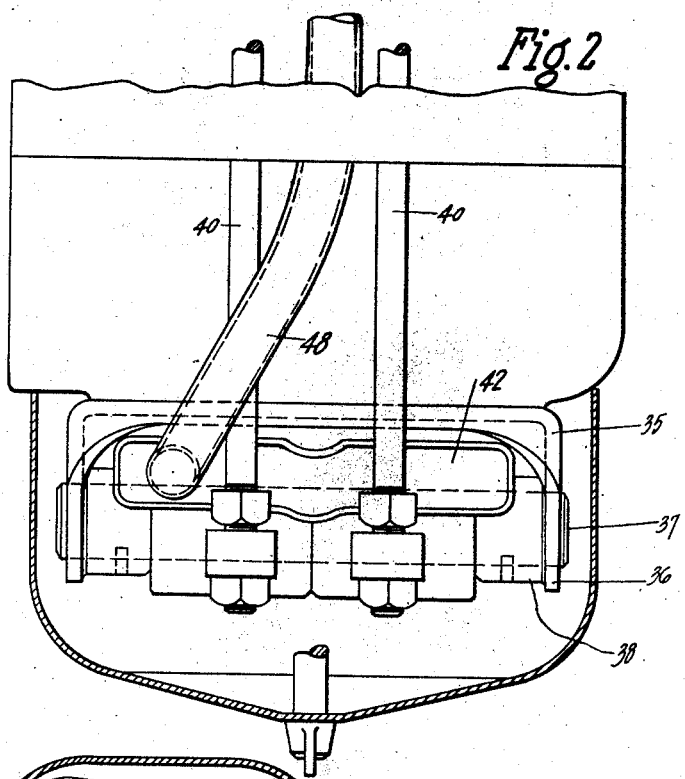
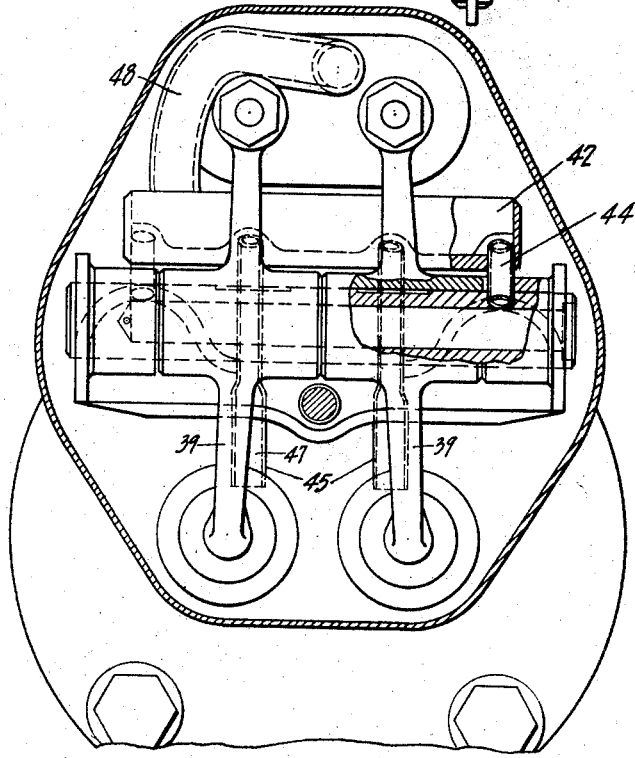
Inventor
C. F. Patterson
By Paul O. Pippel
Atty.

Patented Sept. 15, 1942

2,296,178

UNITED STATES PATENT OFFICE 2,296,178

LUBRICATION SYSTEM

Charles F. Patterson, Chicago, Ill., assignor to International Harvester Company, a corporation of New Jersey Application May 10, 1941, Serial No. 392,827

8 Claims. (Cl. 184—6)

This invention relates to a lubrication system, and more particularly to a lubrication system for an internal combustion engine.

The invention contemplates and has for its principal object the provision of means particularly adapted to lubricate portions of an internal combustion engine by the provision of lubricant-conducting means communicating with the engine crank-case or other suitable lubricant reservoir. In this respect the invention is directed more particularly to the provision of means providing for lubrication of valve mechanism, and specifically a valve mechanism of the overhead type.

An important object of the invention is to provide lubricant-conducting or supply means in the form of conduits formed of or including lubricant-metering means in the form of lubricant-absorbent material.

Another important object is to provide valve-lubricating means comprising means forming a lubricant-containing chamber around the valve.

A further object is to provide lubricant-absorbent material or metering means in this chamber.

Another object is to provide supporting means for the valve having a groove or recess therein to which lubricant is supplied and from which lubricant is taken to lubricate the valve mechanism.

Another object is to provide in an internal combustion engine means embodying a lubricant conduit communicating between the crank-case of the engine to over-head valve mechanism, the conduit discharging into a lubricant-receiving means provided with a pair of branches, one leading to the valve-operating rock-shaft and the other leading to the valve or valves. A further object is to provide the conduit and receiving means with lubricant-absorbent material.

A still further object in this respect is to provide a hollow valve-operating rock-shaft, which may contain lubricant-absorbent material.

And another object is to provide the foregoing construction or certain features thereof in an internal combustion engine of the horizontal type.

These and other objects and features of the invention will become more apparent as the description is more fully made of the drawings, which disclose a preferred form of the invention.

In the drawings:

Figure 2 is a plan view of the head portion of the engine, partly in section, taken substantially along the line 2—2 of Figure 1; and, Figure 3 is a view of the end of the engine taken substantially along the line 3—3 of Figure 1.

Figure 1:
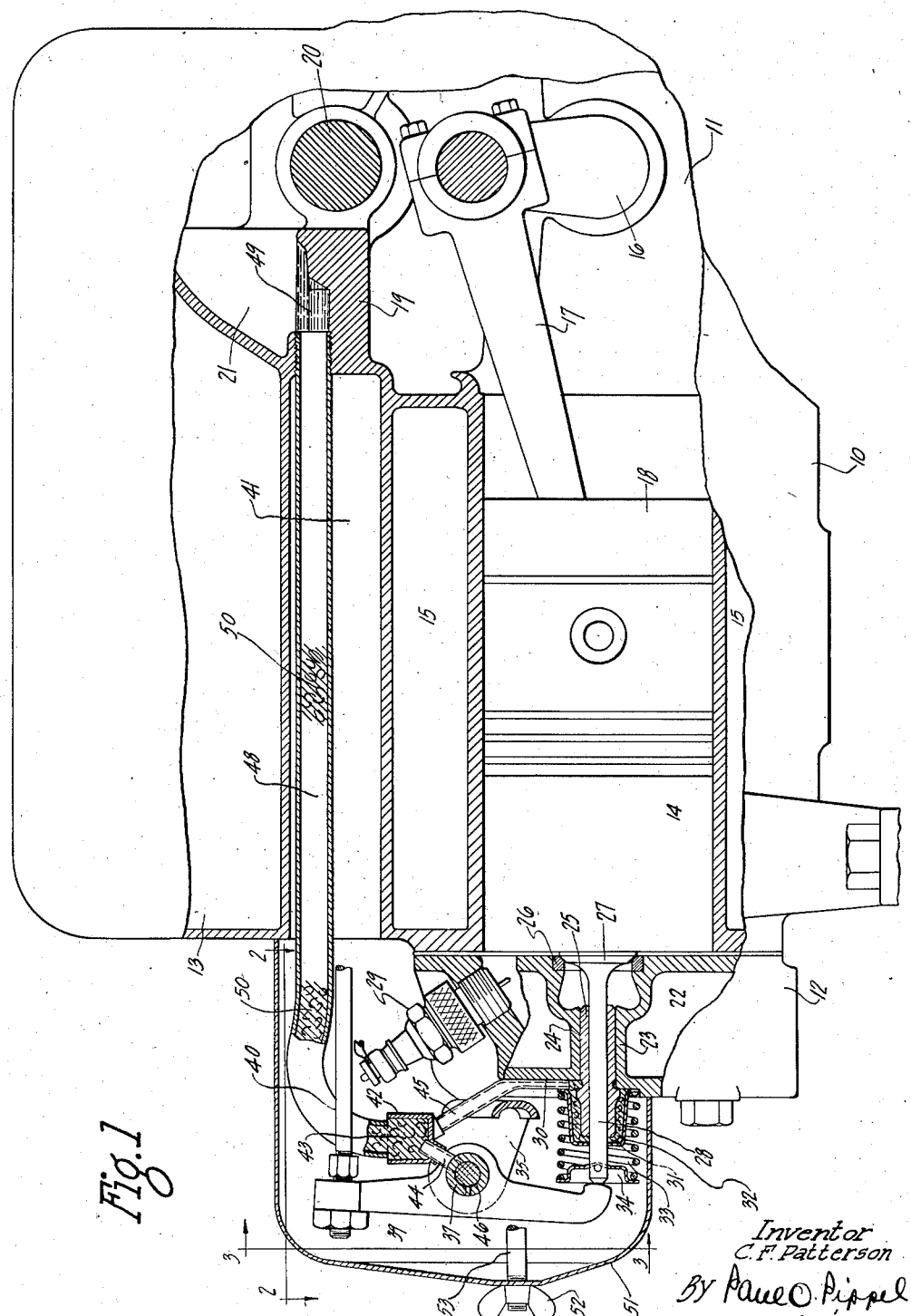
Figure 1 is a sectional view of a portion of an internal combustion engine embodying one form of the invention, the view being taken on a line longitudinally through the cylinder of the engine.

Although, as shown in Figure 1, the engine is of the horizontal, overhead valve type, it is to be understood that the invention in its broader aspects is not limited to an engine of that particular type. Certain features of the invention, however, are especially adapted to a construction of the type referred to, and certain other features of the invention may be admirably utilized in engine constructions of any type.

In the particular type of engine chosen for the purposes of illustration, there is an engine block generally indicated at 10, including a crank-case 11, a cylinder head 12, and a cooling medium reservoir 13. The engine block 10 is provided with a cylinder 14 surrounded in a conventional manner by a water jacket 15. The crank-case 11 carries a crank-shaft 16 suitably connected by a connecting rod 17 to a piston 18 carried in the usual manner in the cylinder 14. An upper portion of the crank-case 11 is provided with a horizontally extending portion 19 serving the dual purpose of providing a bearing for a cam-shaft 20, and of forming an upper lubricant reservoir 21.

The cylinder head 12 is carried at the left-hand end of the engine in the usual manner in engines of the horizontal type and is provided with a conventional form of water jacket 22. An intermediate portion of the head 12, as at 23, is provided with a pair of horizontal bores 24, each of which carries a valve guide 25. A portion of the head in each bore 24 in immediate communication with the cylinder 14 is provided with a valve seat 26, which may be of any suitable type. A pair of valves 27 of the poppet type, each including a stem 28, is slidably carried in the valve guides 25. The head 12 carries at one side thereof a spark plug 29 associated with the combustion chamber in the usual manner.

The outer face of the cylinder head is provided with a pair of recesses or grooves 30 which are associated or in communication with the respective bores 24 in the head. According to the present invention, there is provided means for lubricating the valve stems 28. In the preferred construction illustrated, this means takes the form of an inverted cup-shaped member 31 having an aperture through which the outer end of the valve stem 28 extends. The remaining portion of the cup 31 surrounds the outer portion of the valve guide 25, and the open end of the cup is flanged and seats against the outer surface of the head 12. As best shown in Figure 1, the cup provides an annular lubricant-containing chamber surrounding the portion of the valve guide and valve stem. According to another aspect of the invention, this chamber contains lubricant-metering means, preferably, lubricant-absorbent material such as a wick or the like, generally indicated at 32. The absorbent material 32 in each cup 31 is associated or in communication with the recesses or grooves 30, so that, when lubricant is supplied to the grooves, the material will absorb the lubricant and convey it to those portions of the valve stems projecting between the outer ends of valve guides 25 and the closed ends of the cups 31. The means for supplying lubricant to the recesses or grooves 30 will be hereinafter more particularly described.

Each valve assembly is completed by a coil spring 33 which surrounds the outer portions of the valve stem 28 and cup 31, and engages at opposite ends, respectively, the flanged end of the cup 31 and a retaining member 34 secured to the extreme outer end of the valve stem 28.

The cylinder head 12 carries at its outer face a supporting means in the form of a bracket 35 having opposite ears 36 journaling a preferably hollow rock-shaft 37. Each of the ears 36 is provided with a suitable bearing 38 for carrying the shaft. In the particular type of engine illustrated there are two valves 27, each of which is engaged by one of a pair of rocker arms 39 rockably carried by the rock-shaft 37. The rocker arms are operatively connected by operating or push rods 40 to the cam-shaft 20 in the engine crank-case. The engine block 10 is provided with a suitable horizontally disposed chamber 41 which parallels the cylinder 14 and which accommodates the push rods 40.

As previously stated, one of the objects of the invention is to provide means for lubricating the rock-shaft 37. A preferred form of construction is illustrated in the drawings and comprises a lubricant-receiving means in the form of a member or trough 42. This trough may be suitably carried by the bracket 35 and is preferably provided with metering means in the form of lubricant-absorbent material 43. The trough 42 is provided with a first pair of outlet branches or conduits 44 and a second pair 45. The conduits 44 lead to or communicate with the interior of the hollow rock-shaft 37. This shaft is preferably also provided with lubricant-absorbent material. The shaft also has at opposite ends small bores 46 communicating with the bearings 38 on the bracket 35. The conduits 45 extend away from the trough 42 and toward the cylinder head 12. As best shown in Figures 1 and 3, each of the two conduits 45 has one end thereof flattened, as at 47, and is fitted into a respective recess or groove 30. The conduits 45 thus provide means for directing or supplying lubricant from the trough 42 to the valve-lubricating means comprising the cups 31 and absorbent material therein. Inasmuch as the conduit 45 is flattened, the outer surface of the cylinder head in the vicinity of the valve is comparatively smooth and there is thus provided a suitable seat for the flanged end of the cup 31.

The means for supplying lubricant to the valve-operating mechanism is completed by the provision of lubricant-supplying means in the form of a conduit 48 extending through the horizontal chamber 41 and between the upper reservoir 21 in the crank-case 11 and the lubricant-receiving means or trough 42 on the cylinder head. In the preferred construction illustrated, one end of the conduit 48 fits into a cut-out portion 49 in communication with the reservoir 21, and the other end of the conduit opens into the trough 42. Lubricant from the reservoir 21 may thus flow to the trough 42 to be distributed to the rock-shaft 37 and to the valves 27. The conduit 48 is preferably provided with lubricant-absorbent material, as at 50, which provides means for metering the flow of lubricant between the crank-case and the valve-operating mechanism.

The portion of the cylinder head which carries the valve-operating mechanism also carries a cover 51 secured by wing nuts 52 to studs 53 extending from the cylinder head. This cover suitably encloses the valve-operating mechanism and the portion of the lubricating system extending beyond the engine block 10. The remainder of the lubricating system, namely the conduit 48, is, of course, enclosed in the chamber 41 of the block 10.

From the foregoing description, it will be seen that, according to the present invention, there has been provided an improved lubrication system for the valve-operating mechanism of an internal combustion engine. Certain of the objects and features of the invention have been pointed out above and certain others will be readily apparent to those skilled in the art. It will be understood, of course, that the foregoing description pertains to the preferred form of the invention illustrated and that numerous modifications and alterations may be made in that construction without departing from the spirit and scope of the invention as defined in the appended claims.

What is claimed is:

1. For an internal combustion engine of the horizontal type including a crank-case provided with an upper lubricant reservoir, a cylinder and cylinder head at one side of the crank-case, valve mechanism carried by the cylinder head and including a rock-shaft and a movable valve having a moving surface contacting the cylinder head, valve-operating mechanism including an operating rod extending horizontally between the rock-shaft and the crank-case over the cylinder, a lubrication system comprising a lubricant-receiving member adjacent the rock-shaft, a lubricant conduit generally paralleling the valve-operating rod and extending from the crank-case reservoir to the lubricant-receiving member, valve-lubricating means for lubricating the aforesaid valve surface including a cup member surrounding the valve and having its open end seating on that portion of the cylinder head immediately adjacent the valve, absorbent material in said cup member, a conduit connecting the receiving member and the cup member, and a conduit connecting the receiving member and rock-shaft.

2. For an internal combustion engine having a support provided with a flat face, and valve mechanism including a valve having a stem slidably carried by and extending through the face in the support, means for supplying lubricant to the face of the support, valve-lubricating means comprising a cup member surrounding the valve stem and having its open end seating on the face of the support, and lubricant-absorbent material contained in the cup member and adapted to receive lubricant from the face of the support.

3. For an internal combustion engine having a support provided with a flat face having a recess therein open to said face, and valve mechanism including a valve having a stem slidably carried by and extending through the face in the support adjacent the recess, valve-lubricating means comprising a cup member surrounding the valve stem and having its open end seating on the face of the support and open to the recess, lubricant-absorbent material contained in the cup member, and means for supplying lubricant to the recess.

4. In an internal combustion engine, a cylinder head having a face formed with a valve bore therein and a recess adjacent the bore and open to said face, a valve including a stem slidably carried in the bore, valve-lubricating means carried by the cylinder head in lubricating relation with the valve and associated with the recess, and means for supplying lubricant to the recess.

5. In an internal combustion engine, a cylinder head having a generally flat face formed with a valve bore therein and a groove adjacent the bore, a valve including a stem slidably carried in the bore, valve-lubricating means carried by the cylinder head in lubricating relation with the valve and associated with the groove, and means for supplying lubricant to the groove including a supply conduit carried in the groove.

6. In an internal combustion engine, a cylinder head having a generally flat face formed with a valve bore therein and a groove adjacent the bore, a valve including a stem slidably carried in the bore, valve-lubricating means carried by the cylinder head in lubricating relation with the valve and associated with the groove, said means comprising cup-encased lubricant-absorbent material surrounding the valve stem and having contact with the groove.

7. In an internal combustion engine, a cylinder head having a generally flat face formed with a bore therein and a recess adjacent the bore and open to said face, a valve guide carried in the bore, a valve including a stem slidably carried by and extending through the guide, the guide separating the valve stem from the recess, valve-lubricating means carried by the cylinder head and including an inverted cup member surrounding the valve stem and guide and having its closed end formed with an aperture through which the valve stem extends and having its open end seating on the cylinder head and overlying a portion of the recess, said cup and valve guide providing an annular lubrication chamber about a portion of the valve stem, a portion of the cup being in communication with the recess in the cylinder head, and means for supplying lubricant to the recess.

8. In an internal combustion engine, a cylinder head having a generally flat face formed with a bore therein and a recess adjacent the bore and open to said face, a valve guide carried in the bore, a valve including a stem slidably carried by and extending through the guide, the guide separating the valve stem from the recess, valve-lubricating means carried by the cylinder head and including an inverted cup member surrounding the valve stem and guide and having its closed end formed with an aperture through which the valve stem extends and having its open end seating on the cylinder head and overlying a portion of the recess, said cup and valve guide providing an annular lubrication chamber about a portion of the valve stem, lubricant-absorbent material in said chamber and in communication with the recess in the cylinder head, and means for supplying lubricant to the recess.

CHARLES F. PATTERSON.